United States Patent
Sullivan et al.

(10) Patent No.: US 7,209,795 B2
(45) Date of Patent: *Apr. 24, 2007

(54) METHOD OF SYNCHRONIZING THE PLAYBACK OF A DIGITAL AUDIO BROADCAST BY INSERTING A CONTROL TRACK PULSE

(75) Inventors: Gary E. Sullivan, Trabuco Canyon, CA (US); Dusty D. Rector, Southlake, TX (US)

(73) Assignee: Gateway Inc., Irvine, CA (US)

( * ) Notice: Subject to any disclaimer, the term of this patent is extended or adjusted under 35 U.S.C. 154(b) by 1155 days.

This patent is subject to a terminal disclaimer.

(21) Appl. No.: 10/128,119

(22) Filed: Apr. 23, 2002

(65) Prior Publication Data

US 2003/0198254 A1   Oct. 23, 2003

(51) Int. Cl.
*G06F 17/00* (2006.01)
*H04J 3/06* (2006.01)

(52) U.S. Cl. ........................ 700/94; 370/503
(58) Field of Classification Search ................ 370/503; 386/66; 348/464, 495, 515, 537; 700/94
See application file for complete search history.

(56) References Cited

U.S. PATENT DOCUMENTS

| | | |
|---|---|---|
| 3,798,650 A | 3/1974 | McComas et al. |
| 4,005,266 A | 1/1977 | Lehr et al. |
| 4,234,958 A | 11/1980 | Pipes et al. |
| 4,543,657 A | 9/1985 | Wilkinson |
| 4,843,617 A | 6/1989 | Marshall et al. |
| 5,146,585 A | 9/1992 | Smith, III |
| 5,388,102 A | 2/1995 | Griffith et al. |
| 5,402,450 A | 3/1995 | Lennen |
| 5,416,808 A | 5/1995 | Witsaman et al. |
| 5,469,467 A | 11/1995 | Vella-Colerio |
| 5,530,704 A | 6/1996 | Gibbons et al. |
| 5,734,985 A | 3/1998 | Ito et al. |
| 6,175,604 B1 | 1/2001 | Noro et al. |
| 6,243,372 B1 | 6/2001 | Petch |
| 6,466,832 B1 * | 10/2002 | Zuqert et al. ............... 700/94 |
| 6,594,601 B1 * | 7/2003 | Umminger et al. .......... 702/94 |
| 6,598,172 B1 * | 7/2003 | VanDeusen et al. ........ 713/503 |
| 6,611,537 B1 * | 8/2003 | Edens et al. ................ 370/503 |
| 2004/0148159 A1 * | 7/2004 | Crockett et al. ............ 704/211 |
| 2006/0002681 A1 * | 1/2006 | Spilo et al. ................... 386/46 |

* cited by examiner

*Primary Examiner*—Sinh Tran
*Assistant Examiner*—Andrew C Flanders
(74) *Attorney, Agent, or Firm*—Scott Charles Richardson; McGrath, Geisler, Olds & Richardson (57) ABSTRACT

A method is provided for synchronizing the playback of a digital audio broadcast on a plurality of network output devices by inserting a control track pulse in an audio stream of the digital audio broadcast. The method includes the steps of outputting a first control track pulse as part of an audio signal which has unique identifying characteristics and is regularly occurring, outputting a second control track pulse so that the time between the first and second control track pulses must be significantly greater than the latency between sending and receiving devices, and coordinating play of audio at the time of the occurrence of the transmission of the second control track pulse assuring the simultaneous output of the audio signal from multiple devices. The control track pulses have a value unique from any other portion of the audio stream. The digital audio broadcast from multiple receivers does not present to a listener any audible delay or echo effect.

14 Claims, 7 Drawing Sheets

CONTROL TRACK PULSE
TRANSMITTED BY PCA

CONTROL TRACK PULSE
RETURNED TO PCA FROM PC$_N$

LATENCY

CONTROL TRACK PULSE
ACTED UPON BY PC$_N$

TIME DRIFT

CONTROL TRACK
PULSE

AUDIO AND
OTHER DATA

METHOD OF SYNCHRONIZING THE PLAYBACK OF A DIGITAL AUDIO BROADCAST BY INSERTING A CONTROL TRACK PULSE

This invention references a patent application entitled "A Method of Synchronizing Clocks the Playback of a Digital Audio Broadcast using an Audio Waveform Sample", and a patent application entitled "A Method of Manually Fine-Tuning Audio Synchronization of a Home Network".

FIELD OF THE INVENTION

This invention generally relates to audio playback for multiple devices, and specifically, to synchronizing the audio playback.

BACKGROUND OF THE INVENTION

In order to achieve a depth and richness of sound, two or more audio devices are used to provide a surround sound effect to the listener. These audio devices may be cabled to a controller device which provides the audio data to them. A bus may be used to supply this data. Alternatively, the different devices may communicate with each other through wireless communication, such as through an RF or infrared port.

In a system in which one computer or device broadcasts a single digital audio stream that is then simultaneously received by more than one receiving device, the different receiving devices will often play their audio slightly out of sync with each other, due to differing latencies in receiving and processing the digital audio stream. This produces an echo or delay effect which causes a listener to receive the same audio at slightly different times from the multiple devices. The listener's enjoyment is thereby impaired.

A method and apparatus for synchronizing the playback of audio from several devices is needed.

SUMMARY OF THE INVENTION

The present invention provides a method and apparatus for synchronizing the playback of the audio from several audio receivers by using a control track pulse so that there is no audible delay or echo effect between them when listened to simultaneously.

In a first aspect of the present invention, a method is disclosed for synchronizing the playback of a digital audio broadcast on a network output devices by inserting a control track pulse in an audio stream of the digital audio broadcast. The method includes the steps of outputting a first control track pulse as part of an audio signal which has unique identifying characteristics and is regularly occurring, outputting a second control track pulse, consecutive to the first control track pulse, so that the time between the first and second control track pulses must be significantly greater than the latency between sending and receiving devices (at least two times greater; preferably three, four, or more times greater), and coordinating play of audio at the time of the occurrence of the transmission of the second control track pulse assuring the simultaneous output of the audio signal from multiple devices. The control track pulses having a value unique from any other portion of the audio stream. The digital audio broadcast from multiple receivers not presenting to a listener any audible delay or echo effect.

In a second aspect of the present invention, a system for synchronizing audio playback of multiple receiving devices is disclosed which has a transmitting device and two or more receiving devices, wherein the receiving devices are synchronized through at least two of the group consisting of a control track pulse, communication latency, and processing latency. The system has a time drift detector, a clock synchronizer, a latency detector, and manual fine tune control. The receiving devices are synchronized through control track pulses and the communication latency is shorter than the time interval between consecutive control track pulses.

In a third aspect of the invention, a system for synchronizing the audio playback of two or more receiving devices is disclosed which has means for transmitting consecutive control track pulses in an audio stream and means for receiving the consecutive control track pulses in the audio stream. The time the means for receiving the control track pulse takes to act upon the audio signal is determined by a communications latency between the transmitting means and the receiving means and a processing latency is determined by internal processing by the receiving means. There is also means for synchronizing clocks located in the receiving means and means for detecting time drift in the receiving means.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 9, exemplary embodiments of the present invention are shown This invention describes a method of enabling simultaneous output of audio signals on multiple output devices by including time output information pulse output signal information, and a user adjustable control to control the delay of signal between source and output systems. The method may be used to synchronize audio output on network output devices. The method may use a network clock synchronization method to sync the clocks of all the connected devices. In addition to this synchronization, a regularly scheduled control track pulse is also broadcast. The control track pulse may be used as a triggering metric for audio output according to the attached tag thus assuring the simultaneous output of audio from multiple devices. The control track pulse may also be used to determine the time the device takes to process the signal from the buffer to the actualized audio output. This delay is added to the communication delay to better synchronize the audio output between multiple output devices. The effect of the process is that all devices receiving the data are able to output them simultaneously taking both communication and processing latency into consideration.

The method of synchronizing audio playback may be employed on a set of audio playback devices tuned to a common network digital audio broadcast. All audio playback devices are running synchronized clocks. This method does not require that the transmitting device be in sync with the receivers. Preferably, the receivers stay in sync. The method uses a latency detector, a clock synchronizer, and a time drift detector. A master reference computer or other device first sets its own clock, then sets all clocks on all receiving devices using the latency detector and clock synchronizer. It periodically repeats the process, possibly during silence between audio broadcasts, so that the clocks stay in sync. Each receiver also periodically adjusts for time drift, between clock synchronizations, using its time drift detector.

Figure 8:
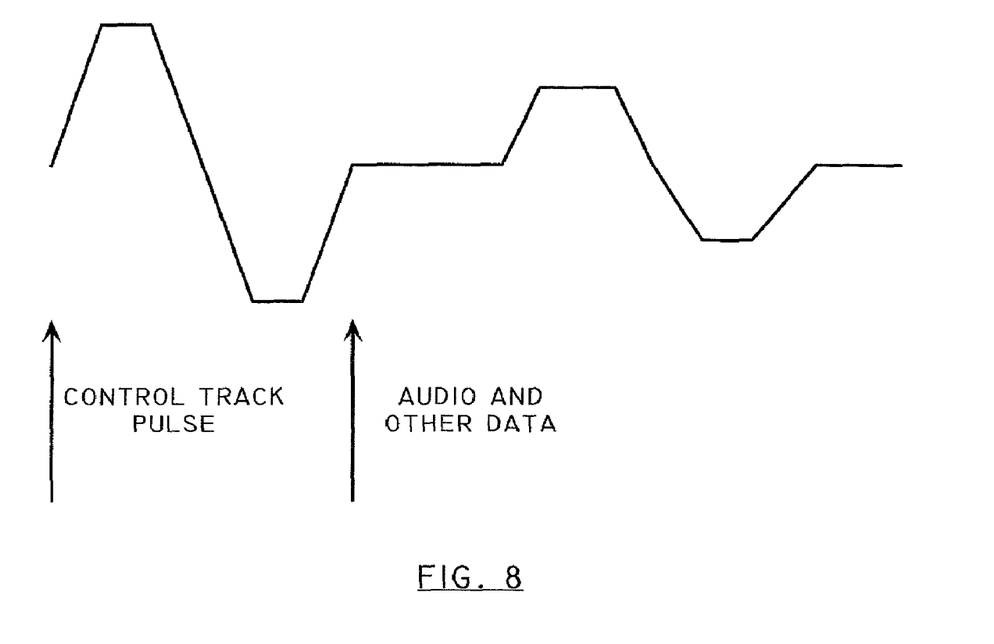
FIG. 8 illustrates an example of a control track pulse in an audio stream.

The present invention provides a method and apparatus for synchronizing the audio playback of several devices by using a control track pulse. A control track pulse is inserted into the audio stream. The audio transmitting device inserts a control track pulse or marker into the digital audio stream at regular known intervals, i.e., exactly one per 2 seconds of audio, beginning at 0:00. This is similar to control pulses added to video tape signals to support time tracking on consumer video equipment. Like the time code value, it can be used to synchronize playback between two or more audio receivers, but unlike the time code, it is not required that the transmitter have a clock that is synchronized with the clocks of the receivers (for instance, it could be in a remote location). A "pulse" could be something as simple as inserting a single audio sample of maximum amplitude, while reducing any such naturally occurring value by one, so that the pulse value is unique in the digital stream. An example of a control track pulse is shown in FIG. 8. The audio transmitting device inserts a reference pulse into the audio stream using the control track pulse generator. The time between two pulses (pulse interval) must be significantly greater than the latency between any device and the transmitter. The method may employ a process which is a code module which has at least one thread and one unfragmented space of unfragmented virtual memory so that each process is protected from other processes. The method may also be implemented through hardware.

All devices may buffer the audio stream. In one embodiment, some amount of buffering of the audio stream is occurring, to allow the receiving devices to search forward and backward in the audio data, and to allow them to delay or shift audio playback. Signal transmission may be in analog or digital format.

The transmitting device might or might not be playing audio and does not have to be in sync with the receivers. If the transmitting device is local and playing audio, it would participate in the same synchronized audio playback method.

Figure 1:
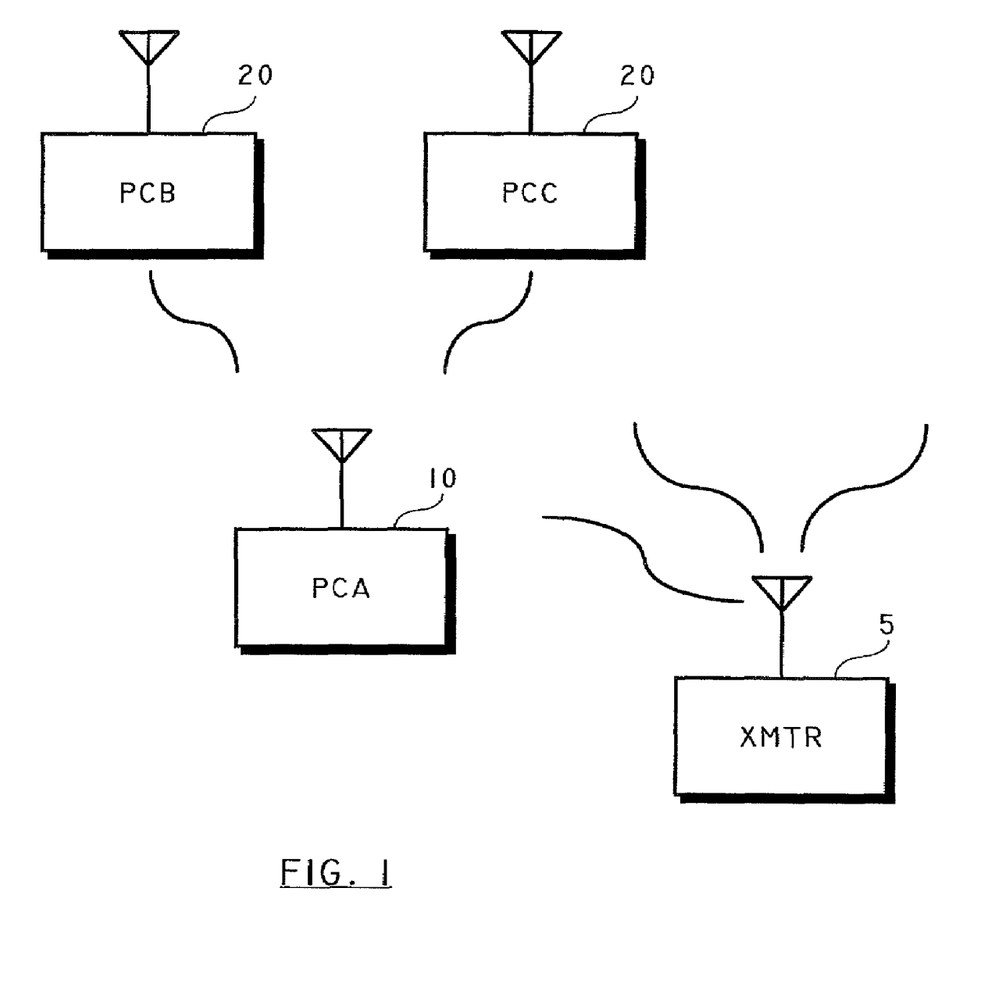
FIG. 1 illustrates a system having a plurality of devices.

FIG. 1 illustrates a system of several devices. Transmitting device PCA sends the audio stream, sync information, and time and other data to receiving devices PCn, such as PCB and PCC. Transmitting device PCA controls audio playback for the system. The audio signal is actually transmitted by audio source 5 to PCA and other devices PCn such as PCB. The devices may be interconnected by a bus cabling or may communicate with one another through wireless communication, such as radio frequency or infrared.

Several discrete sub-processes are used in an embodiment of the present invention. These may include a latency detector, a clock synchronizer, a time drift detector, and manual fine tune control. Each networked device supplies a real-time system clock that can be set, that measures time in increments since some beginning absolute point in time, and that measures time in sufficiently small increments to be used as a synchronization reference for digital audio.

An average latency detector detects the average latency between transmitting a signal to a device, and the device receiving the signal. "Symmetrical latency" is assumed between two computers, e.g., if a signal packet is sent from PCA to PCB, and an acknowledgment packet is returned from PCB to PCA, the time from PCA to PCB will be, on average, approximately the same as from PCB to PCA.

All devices may account for latency of their own audio playback subsystem. Playback devices must also account for normal latency in the audio subsystem. There are three different methods for this, each of which would occur after the other processes described herein have been used to synchronize the clocks on all audio playback devices. First, shifting the playback by a predetermined value, such value determined through empirical testing of the actual playback device. Second, shifting the playback by a predetermined value, such value determined at run time, by the customer, using the manual audio synchronization fine-tune control, to determine the actual latency of the device's internal audio subsystem. Third, fine-tuning the clock synchronization at run time, by the customer, using the manual audio synchronization fine-tune control.

In an embodiment of the method, several steps are used to determine the latency. First, a variable "latency" is set to 0. Second, PCA fetches its current time and records from "Start Time". Third, PCA sends a signal packet to PCB. Fourth, PCB receives the message and immediately sends an acknowledgment to PCA. Fifth, upon receiving the acknowledgment from PCB, PCA again fetches its local time and records one-half of the difference between Start Time and the current time. Sixth, PCA averages this new latency value with all previous latency values and records it as "latency". After n repeated cycles, it discards any "outliers", values that are not close to the current average. The second through sixth steps are repeated as many times as necessary to get an accurate time reference.

Figure 2:
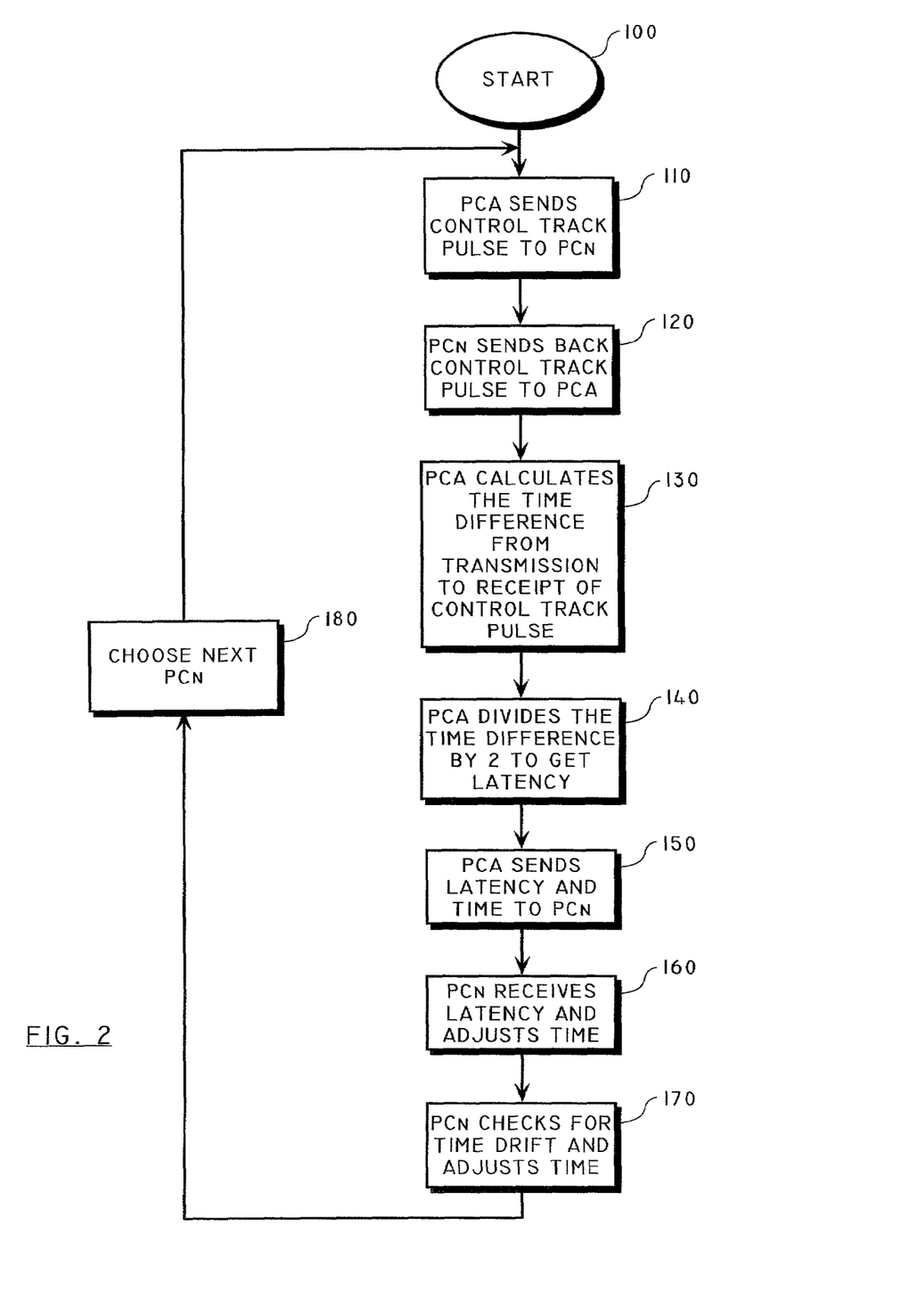
FIG. 2 illustrates a flow chart for setting the time in a receiver device.

FIG. 2 illustrates a flow chart of the steps. At the start, step 100, the latency value is set to zero. The controlling device, PCA, sends the control track pulse to receiving device PCn, step 110. PCn sends back the control track pulse to PCA, step 120. PCA calculates the time difference from the transmission of the control track pulse to its receipt back from the receiving device PCn, step 130. PCA divides the time difference by two to derive the latency, step 140. PCA sends the latency and time to PCn, step 150. PCn receives the latency and adjusts the time, step 160. PCn checks for time drift and adjusts its time, step 170. The next receiving device, PCn, is sent data, step 180.

Figure 4:
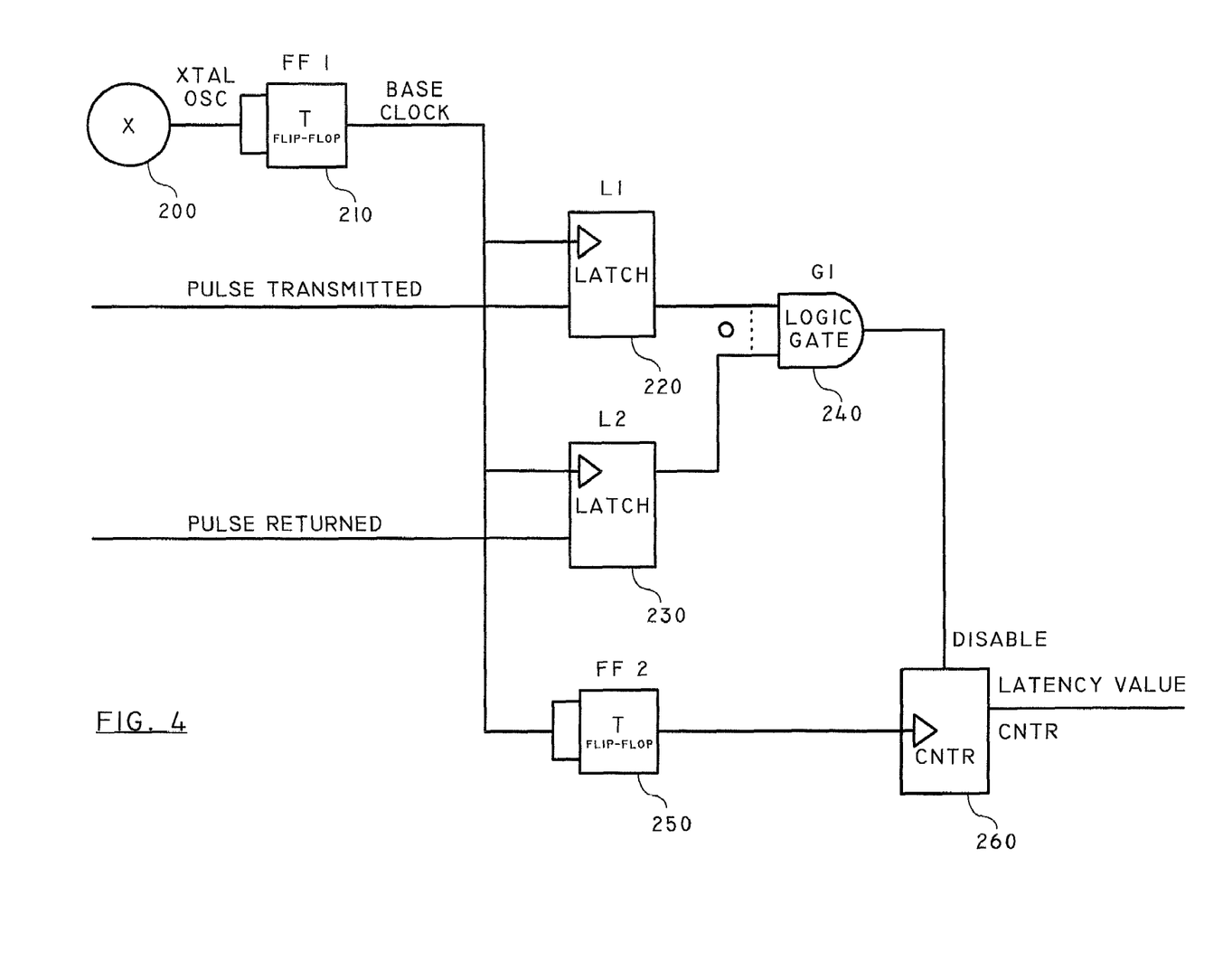
FIG. 4 illustrates an exemplary circuit for deriving the latency value from the control track pulse.

FIG. 4 illustrates an example of a hardware implementation to derive a latency value on the assumption of symmetrical latency. An oscillator 200, e.g., a crystal oscillator, is biased to provide a high frequency regular pulsing signal. This is input to a T flip-flop 210 which generates a regular, well squared base clock. The base clock drives the timing of the entire device, including latches 220 and 230 and T flip-flop 250. Latch 220 stores the control track pulse or a signal representing when it is active. Transmission of the control track pulse may cause the generation of a counterpart digital pulse to be input to the circuit of FIG. 4 as representing the control track pulse. Likewise, PCA's receipt of the control track pulse from PCn may cause the generation of a counterpart digital pulse to be input to the circuit of FIG. 4. These digital pulses may be generated by pulse width adjustable monostable multivibrators or other means. Latch 230 stores the control track pulse returned from receiving device PCn. Logic 240 allows the counter 260 to count from the time the control track pulse is sent until the control track pulse is returned to PCA from PCn. All the time the T flip-flop is providing a clock signal equal to ½ the clock rate of the base clock, effectively performing a divide-by-two operation to derive the latency value.

If the assumption of symmetrical latency (above) is not true, and if the asymmetry between latency values due to differing performance characteristics between two types of computers can be quantified, this value might be either more or less than one-half.

In the case of asymmetrical latency, various techniques may be employed to determine the latency time between the transmitting device and the receiving device.

Figure 5:
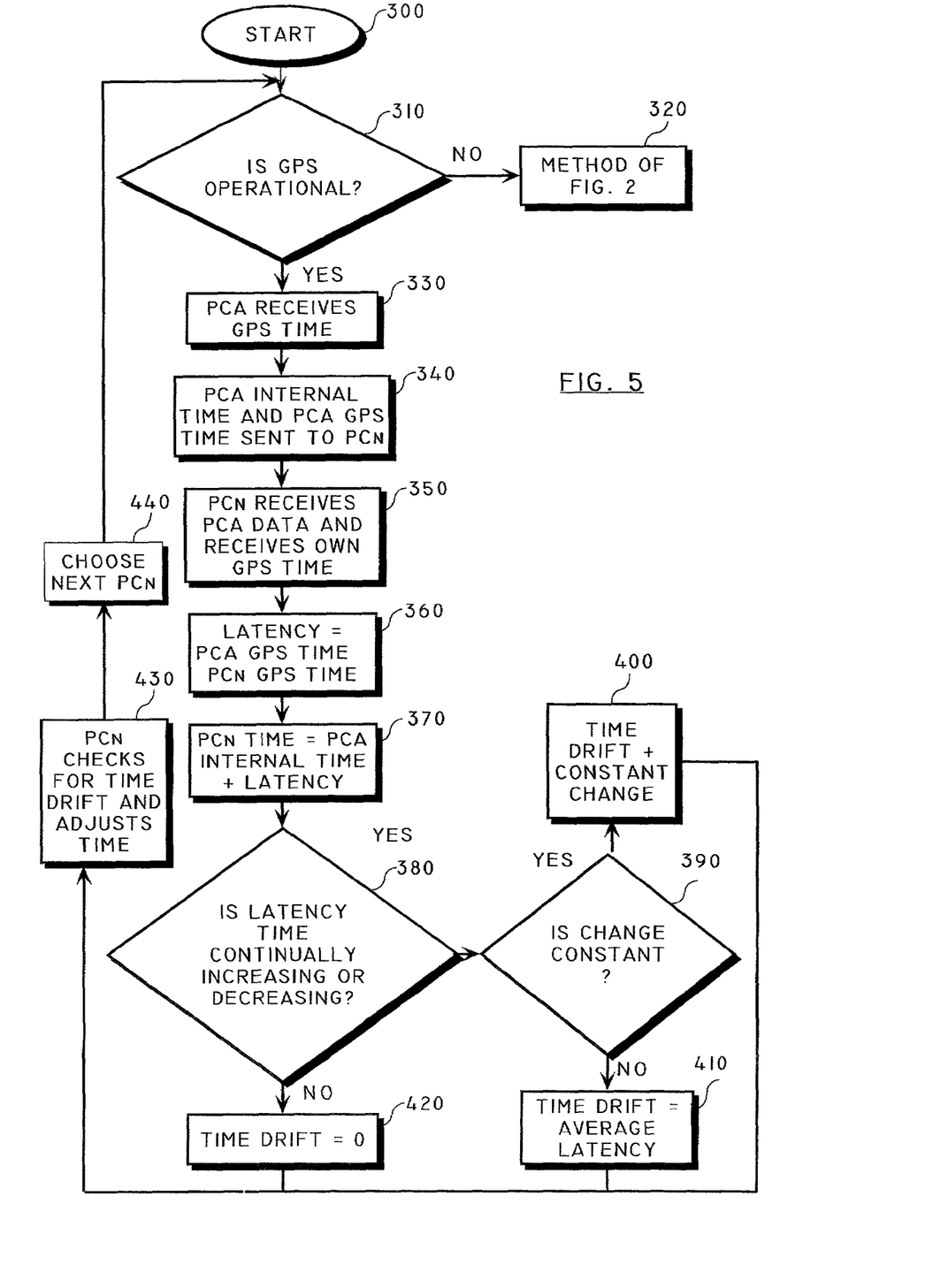
FIG. 5 illustrates an embodiment which uses GPS as the primary system for timing the audio.

In one embodiment, as shown in FIG. 5, the control track pulse transmitting device and receiving devices have global positioning system (GPS) receivers which allow time management at the microsecond level. The control track pulse transmitting device initializes, step 300, and determines if the GPS time is accessible, step 310. If the GPS time is not accessible, the method of FIG. 2 is used. Otherwise, PCA receives the GPS time, step 330. PCA sends its internal time and GPS time to PCn, step 340. PCn receives this data and accesses its own GPS time, step 350. The latency for PCn is determined by subtracting the GPS time of PCA from the GPS time of PCn, step 360. The PCn time is determined by adding the latency to PCA time, step 370. PCn determines whether the latency is continually increasing or decreasing, step 380. This is done by storing successive samples of latency in chronological order and comparing the different values for trends in magnitude over time. Look up tables may be used for this process. If the change is continually increasing or decreasing, a determination is made as to whether the change is constant, step 390. If it is constant, the time drift is set to the constant change over sample time, step 400. Otherwise, the time drift is set to the average latency, step 410. If the latency time is not continually increasing or decreasing, the time drift is set to zero, step 420. PCn adjusts its time according to the time drift, step 430. The next PCn is selected to receive data, step 440.

A clock synchronizer is a process that one networked computer may use to synchronize another networked computer's clock to its own. By extension, it can then synchronize all of the clocks on n computers by connecting to other computers and repeating the process.

Figure 6:
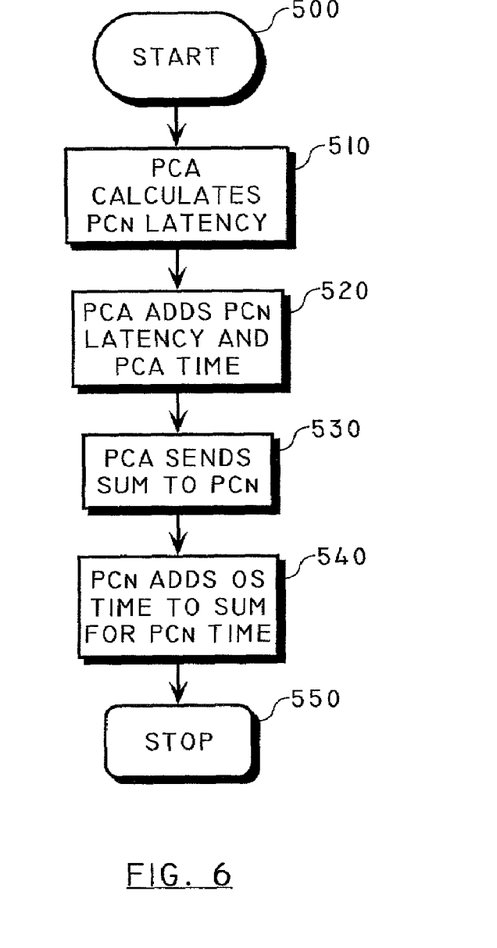
FIG. 6 illustrates a transmitting device's method for calculating PCA and latency time.

In an exemplary embodiment, as shown in FIG. 6, the method includes the following steps. First, the clock synchronizer utilizes the latency detector (above) to determine the average amount of time it takes for a signal to travel from the reference computer or device (PCA) to another device (PCB). Second, PCA fetches its own time, adds the latency value to it and sends it to PCB. Third, PCB takes this time value and adds a known value representing the time it takes for the operating system (OS) to respond to a "time set" command, and sets its own time accordingly.

Figure 7:
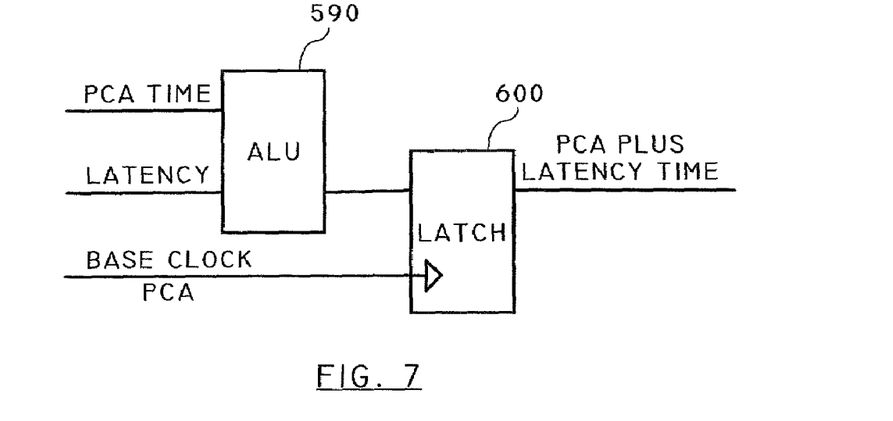
FIG. 7 illustrates an exemplary circuit for deriving a receiving device's time.
Figure 9:
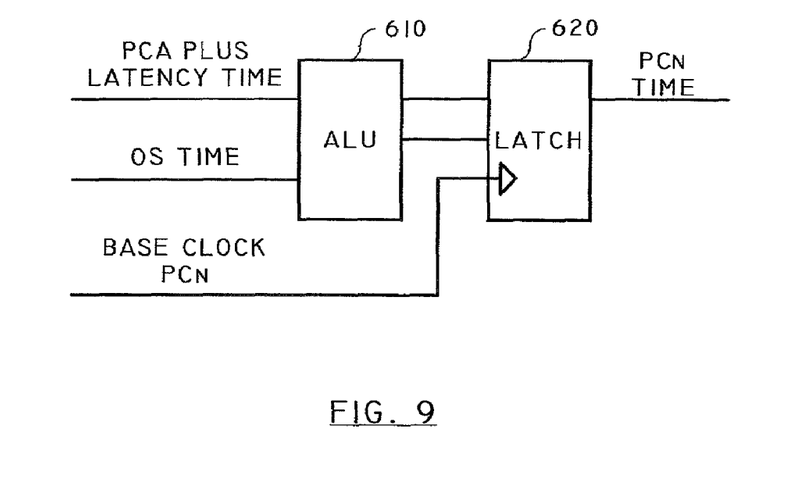
FIG. 9 illustrates a receiving device's method for calculating PCn time.

An exemplary hardware implementation of the circuitry is shown in FIGS. 7 and 9. FIG. 7 refers to circuitry on PCA; FIG. 9 refers to circuitry on PCn. The circuitry of FIGS. 7 and 9 may be combined on either PCA or PCn. ALU 590 adds the latency to PCA time to derive the time to be sent to PCn. The base clock which serves for internal timing of PCA clocks latch 600. This latch stores the PCA with added latency time. FIG. 9 shows a like circuit on receiving device PCn. The ALU 610 causes the addition to or subtraction from the time drift with respect to the PCA with added latency time. The latch 620 stores the value for the PCn time.

A time drift detector is a simple process by which a device that is periodically receiving a time standard from the clock synchronizer checks for the amount that its own clock is drifting from the time standard, and compensates for it by periodically adding or subtracting from its own clock. It assumes that a device's system clock might drift, fast or slow, relative to the master device's clock, and that the rate of drift is constant. The time drift detector may be implemented in hardware, software, or a combination of hardware and software.

Figure 3:
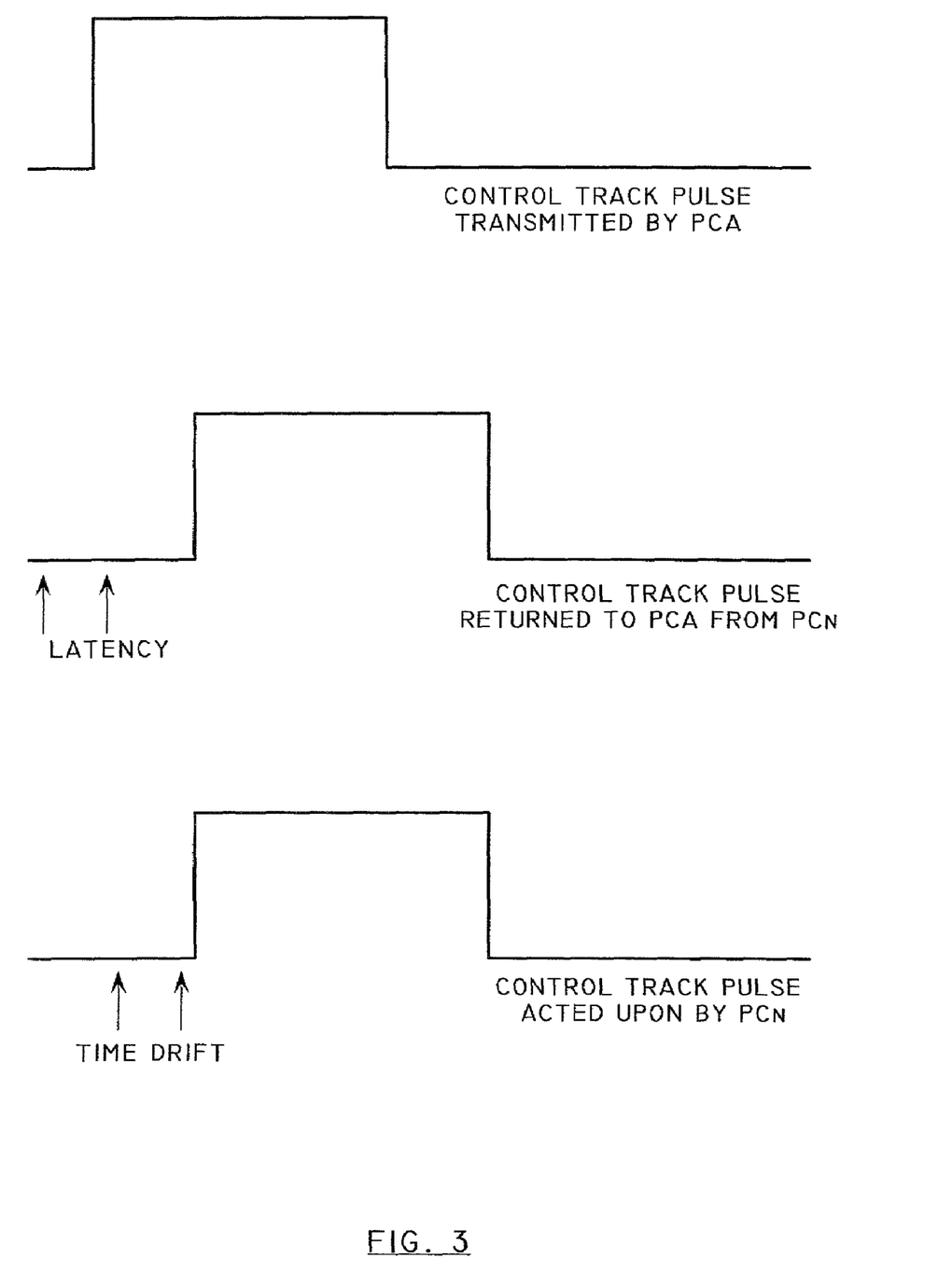
FIG. 3 illustrates the delay on the control track pulse through latency and a potential effect of time drift.

FIG. 3 illustrates time displacements of the control track pulse. Approximately one half the time the control track pulse travels from PCA to PCn is the latency. A delay occurs from the receipt of the control track pulse until it is acted upon by PCn. This is the time drift.

A manual audio synchronization fine-tune control allows the user to "fine tune" the end results of automated synchronization. It also allows the user to manually determine the internal latency of a device audio playback subsystem, by comparing the amount and direction of playback latency error between itself and a reference system with a known internal audio subsystem latency value. The system requires two devices playing audio, one that is the reference (PCA), and one that is adjusted by the user (PCB). The method assumes that the reference player PCA buffers and delays its own audio playback, so that PCB is able to move its own playback either forward or backward in time, relative to PCA. PCA synchronizes its clock with PCB. PCA emits an audible high-pitched pulse every n seconds, on even n second boundaries. PCB emits an audible pulse every n seconds, on even n second boundaries. PCB displays a graphic slider control to the user, defaulted to "centered" position. As the user slides the control left or right, PCB increments/decrements a correction value, and simultaneously shifts the audio click forward or backward in time. The user adjusts the slider until the two clicks converge and sound to the user as a single click. The resultant correction value may be added or subtracted from PCA's known internal latency value, to determine PCB's internal latency value.

The above process describes three separate roles for devices. However, a single device could take on any of the three roles described, i.e., it could be a receiver and the time reference, or the time reference and the audio transmitter, and the like. The process is a single time reference device (probably one of the receivers) first sets its own clock, then sets the clocks on all other receiving devices. Each receiver periodically adjusts itself for time drift. Keeping time synchronized on all receivers is its only responsibility. Each receiving device keeps the playback of the audio in sync with other devices by obtaining the exact time of the received pulse relative to its own (synchronized) clock, and then delaying the audio until the pulse exactly aligns with the next multiple of the pulse interval. For instance, if the pulse interval is once every 5 seconds, but the pulse appears 570 milliseconds prior to 2:15, the audio playback is delayed for 570 milliseconds. Note that the effect of this is that the playback on all devices is in sync, but always behind the transmission by approximately the pulse interval.

It is believed that the method of synchronizing the playback of a digital audio broadcast by inserting a control track pulse of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of synchronizing the playback of a digital audio broadcast on a plurality of network output devices by inserting a control track pulse in an audio stream of the digital audio broadcast, comprising:
   outputting a first control track pulse as part of an audio signal which has unique identifying characteristics and is regularly occurring;
   outputting a second control track pulse, consecutive to the first control track pulse, so that time between the first and second control track pulses must be significantly greater than a latency between a sending device and receiving devices; and
   coordinating play of audio at a time of transmission of the second control track pulse occurs, assuring simultaneous output of the audio signal from the receiving devices,
   the first and second control track pulses having a value unique from any other portion of the audio stream, the digital audio broadcast from the receiving devices not presenting to a listener any audible delay or echo effect.

2. The method of claim 1, wherein the time between the first and second control track pulses is at least one second.

3. The method of claim 2, wherein the time between the first and second control track pulses is at least two seconds.

4. The method of claim 2, wherein the time between the first and second control track pulses is two seconds, plus or minus 50 milliseconds.

5. The method of claim 1, wherein the first control track pulse and the second control track pulse are each a single audio sample of maximum amplitude, while reducing any such naturally occurring value so that the pulse value is unique in the digital stream.

6. The method of claim 1, wherein the latency is derived using each of the first and second control track pulses.

7. The method of claim 6, wherein a the sending device sends out the first and second control track pulses and is clocked at a base clock rate.

8. The method of claim 7, wherein the latency is derived by enabling a counter from the time one of the first and second control track pulses is sent until the time of its return to the the sending device, the counter being clocked at one half the base clock rate.

9. The method of claim 8, further comprising determining time drift of a first receiving device.

10. The method of claim 9, wherein the time drift includes the time for the operating system to respond to a command instruction after the control track pulse has been received by the receiving device.

11. The method of claim 1, wherein a the sending device outputs the audio signal, the receiving devices are all in sync, the sending device is not in sync with the receiving devices, and one of the receiving devices generates and outputs the first and second control track pulses.

12. The method of claim 1, wherein the audio signal is buffered by a transmitting device and the receiving devices.

13. The method of claim 1, wherein the playback of the audio by the receiving devices is manually fine tuned.

14. The method of claim 1, wherein global positioning system data is used by at least one of the receiving devices.

* * * * *